United States Patent
Leu et al.

(10) Patent No.: US 12,448,493 B2
(45) Date of Patent: Oct. 21, 2025

(54) SOLVENT FREE PROCESS FOR MANUFACTURING MEMBRANES

(71) Applicant: ETH Zurich, Zürich (CH)

(72) Inventors: Simon Leu, Buchrain (CH); Wendelin Jan Stark, Langenthal (CH); Anna Margot Beltzung, Zürich (CH); Mario Stucki, Zürich (CH); Olivier Gröninger, Baden (CH); Konstantin Engel, Stuttgart (DE)

(73) Assignee: ETH Zurich, Zurich (CH)

( * ) Notice: Subject to any disclaimer, the term of this patent is extended or adjusted under 35 U.S.C. 154(b) by 301 days.

(21) Appl. No.: 17/800,215

(22) PCT Filed: Mar. 5, 2021

(86) PCT No.: PCT/EP2021/055644
§ 371 (c)(1),
(2) Date: Aug. 16, 2022

(87) PCT Pub. No.: WO2021/176080
PCT Pub. Date: Sep. 10, 2021

(65) Prior Publication Data
US 2023/0082377 A1  Mar. 16, 2023

(30) Foreign Application Priority Data
Mar. 6, 2020  (EP) .................................. 20161591

(51) Int. Cl.
*C08J 9/26* (2006.01)
*B32B 5/02* (2006.01)
(Continued)

(52) U.S. Cl.
CPC ................. *C08J 9/26* (2013.01); *B32B 5/022* (2013.01); *B32B 5/024* (2013.01); *B32B 5/18* (2013.01);
(Continued)

(58) Field of Classification Search
CPC ...... C08J 9/26; C08J 9/009; C08J 2201/0446; C08J 2201/0442; C08J 2201/044;
(Continued)

(56) References Cited

U.S. PATENT DOCUMENTS 6,610,764 B1  8/2003  Martin et al.
2010/0068484 A1  3/2010  Kaufman
(Continued)

FOREIGN PATENT DOCUMENTS

CN  102432946 A   5/2012
EP  0811479 A2   12/1997
(Continued)

*Primary Examiner* — Camie S Thompson
(74) *Attorney, Agent, or Firm* — Anderson Patent Law Firm

(57) ABSTRACT

The invention relates to the manufacturing of porous polymer membranes by (a) providing pellets comprising a polymer matrix and particles in the ratio 90:10 to 10:90, (b) converting said pellets into a non-porous film by a solvent-free process; (c) removing said particles from said film with an aqueous composition to thereby obtain said membrane. The invention further relates to pellets useful in such manufacturing process as well as porous polymer membranes obtainable or obtained by such manufacturing process as well as textile materials and articles containing such membranes; to the use of such pellets, membranes, and articles.

18 Claims, 1 Drawing Sheet

(51) Int. Cl.
*B32B 5/18* (2006.01)
*B32B 7/09* (2019.01)
*B32B 7/12* (2006.01)

(52) U.S. Cl.
CPC .............. *B32B 7/09* (2019.01); *B32B 7/12* (2013.01); *B32B 2266/0228* (2013.01); *B32B 2266/025* (2013.01); *B32B 2266/0257* (2013.01); *B32B 2266/0264* (2013.01); *B32B 2266/0278* (2013.01); *B32B 2307/7163* (2013.01); *B32B 2307/724* (2013.01); *B32B 2307/732* (2013.01); *B32B 2437/00* (2013.01); *B32B 2439/00* (2013.01); *C08J 2201/0442* (2013.01); *C08J 2201/0446* (2013.01); *C08J 2367/00* (2013.01); *C08J 2367/02* (2013.01); *C08J 2367/04* (2013.01); *C08J 2377/00* (2013.01)

(58) Field of Classification Search
CPC ............ C08J 2367/00; C08J 2367/02; C08J 2367/04; C08J 2377/00; B32B 7/09; B32B 7/12; B32B 5/022; B32B 5/04; B32B 5/18; B32B 2266/0228; B32B 2266/025; B32B 2266/0257; B32B 2266/0264; B32B 2266/0278; B32B 2307/7163; B32B 2307/724; B32B 2307/732; B32B 2437/00; B32B 2439/00; C08F 2500/12; C08K 9/08

See application file for complete search history.

(56) References Cited

U.S. PATENT DOCUMENTS

| | | |
|---|---|---|
| 2011/0151259 A1 | 6/2011 | Jarman-Smith et al. |
| 2013/0331493 A1 | 12/2013 | Yamamura et al. |
| 2018/0371687 A1 | 12/2018 | Stark et al. |

FOREIGN PATENT DOCUMENTS

| | | |
|---|---|---|
| EP | 3178873 A1 | 6/2017 |
| JP | 2006287176 A | 10/2006 |
| JP | 2010023017 A | 2/2010 |
| JP | 2010-195899 | 9/2010 |
| WO | 2012/114810 | 7/2014 |

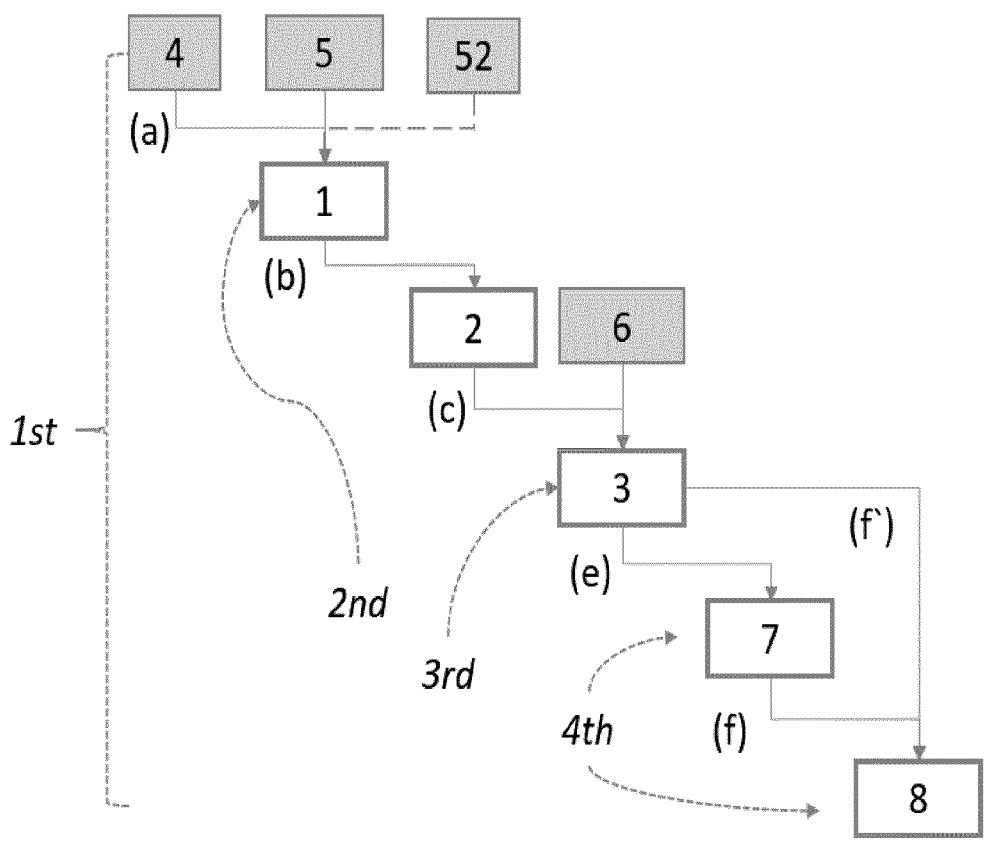

SOLVENT FREE PROCESS FOR MANUFACTURING MEMBRANES

The invention relates to novel methods to obtain polymer membranes as well as to polymer membranes as defined herein. The invention further relates to starting materials suitable for such manufacturing methods and to textiles containing such membranes; to the use of such membranes, textiles and intermediates.

The manufacturing of (porous) membranes is known per se. CN102432946 describes the manufacturing of polyolefine membranes by extrusion of a granular starting material followed by longitudinal and transversal stretching. In many cases, obtaining a porous structure by stretching is considered a disadvantageous process step. EP3178873 describes the manufacturing of membranes starting from a polymer dispersion followed by solvent removal; this process avoids stretching. However, in many cases, the use of solvents is also considered disadvantageous. JP2006287176 describes the manufacturing of membranes by removing plasticizers using organic solvents. Again, the use of organic solvents is considered disadvantageous on a commercial scale. EP0811479 describes the manufacturing of microporous polyolefin composite membranes. The manufacturing includes a stretching step and an extraction step using organic solvents and is therefore disadvantageous for the reasons given above.

US2011/0151259 describes the manufacturing of medical implants, specifically acetabular cups with pores of 100-1000 microns. These implants are manufactured starting from a polymer comprising non-coated sodium chloride ("pharmaceutical grade") as a filler. The intended use as an implant requires rather thick materials and small areas. Although suitable, it was found that it is not possible to transfer this process to either continuous production nor to large scale membranes.

Consequently, there is a need for providing additional/improved manufacturing processes for polymer membranes. There is also a need for further/improved materials to manufacture polymer membranes and for further/improved textiles comprising such membranes.

Thus, it is an object of this invention to mitigate at least some of these drawbacks of the prior art. In embodiments of the present invention improved manufacturing processes for porous polymer membranes are provided. In further embodiments of the invention, porous polymer membranes which are suitable for advanced applications, such as in waterproof and breathable textile materials, are provided. In further embodiments of the invention new materials, suitable e.g. for performing the inventive manufacturing method, are provided.

The present invention will be described in more detail below. It is understood that the various embodiments, preferences and ranges as provided/disclosed in this specification may be combined at will. Further, depending of the specific embodiment, selected definitions, embodiments or ranges may not apply. It is further understood that all references identified herein are incorporated by reference in its entirety.

The above objectives are achieved by providing a manufacturing process as defined in claim 1. Further aspects of the invention are disclosed in the specification and independent claims, preferred embodiments are disclosed in the specification and the dependent claims. The manufacturing process for solvent-free hydrophobic or hydrophilic porous polymer membranes, as described herein, proves to be very versatile, reliable, and simple to control. The process is particularly suitable for fast and low-cost production of large area membranes. Polymer membranes as described herein prove to be useful in applications as defined below and further enable the manufacture of improved articles and/or facilitate manufacture of articles as defined below.

As it will become apparent when reading this specification, the invention particularly relates to a method for manufacturing polymer membranes and corresponding membranes (first aspect); to shaped articles which are suitable for manufacturing such polymer membranes (second aspect); and to articles (including textiles, containers, filters) comprising (i.e. containing or consisting of) such polymer membranes (third aspect).

Further, the present invention will be better understood by reference to figures FIG. 1 shows a schematic view of the inventive process, wherein:

(1) represents shaped articles ("pellets", $2^{nd}$ aspect of the invention)
(2) represents a non-porous film, intermediate material
(3) represents the inventive porous polymer membrane (unsupported; free-standing);
(4) represents the particles ("filler"; including non-coated and coated particles);
(5) represents the polymer matrix of the pellets;
(51) represents the polymer
(52) represents optional additives;
(6) represents the aqueous composition
(7) represents the textile material ($4^{th}$ aspect of the invention)
(8) represents the item (commercial product, $4^{th}$ aspect of the invention); and
(a) ... (f), (f`) are process steps (c.f. first aspect of the invention.

Unless otherwise stated, the following definitions shall apply in this specification:

The term "particle" is known in the field and includes crystalline or amorphous materials. The term includes uncoated particles and coated particles. Further, in the context of this invention, particles are also referred to as "filler", thereby indicating its purpose.

It is known that particles may agglomerate. In the context of the present invention, suitable particles have a diameter in the submicron size range, whereby particle sizes are preferably between 5-10`000 nm, such as 5-4`000 nm.

Suitable particles may be obtained from a range of preparation methods, including high temperature-gas phase processes (such as flame synthesis, laser processes and plasma processes), and liquid phase chemical methods (such as precipitation and sol-gel processes), and milling of particles. Particles particularly suitable in the context of the present invention may be obtained by a precipitation process or by milling of naturally occurring materials. Particles in the context of this invention are pre-manufactured to distinguish from in situ synthesis of particles.

The terms "salt" and "oxide" are known in the field. A salt is defined as the product formed from the neutralisation reaction of acids and bases. Salts are ionic compounds composed of cations and anions so that the product is electrically neutral. Examples of salt classes are halogenides (chlorides, fluorides, bromides, iodides), sulphates, phosphates, carbonates, nitrates, particularly phosphates, carbonates and halogenides. In the context of the present invention, metal oxides (i.e. a product formed by oxidation of a metal) are not considered salts. Metal oxides include stoichiometric and non-stochiometric oxides. Examples of salts are NaCl, $CaCO_3$, an example of an oxide is ZnO.

The term "polymer" is known in the field. The term refers to a material of repeating structural units ("monomers"), particularly to synthetic polymers (comprising synthetic monomers). The term thus includes homo-polymers, co-polymers and blends thereof. The term further includes oligomers. Polymers may be cross-linked. Suitable polymers in the context of this invention include thermoplastic polymers and thermosetting polymers.

The terms "membrane" and "film" are known in the field. The term membrane refers to a shaped article in the form of a permeable film. Accordingly, the membrane distinguishes from a film by its permeability.

The "permeability" of a material as described herein is defined as the flux of a fluid (i.e. a liquid medium or a gaseous medium) through interconnected pores of the material. Permeability is achieved by pores in direction perpendicular to the plane of the membrane. Permeability can be determined by measuring the liquid or gas volume which passes a defined membrane area in a defined time at an applied pressure. A typical measure of this flux is litre per square metre, per bar and hour ([l/(m2*bar*hour)]).

For gaseous medium, the Water vapor transmission rate (WVTR) is a suitable parameter to determine permeability. WVTR is determined in compliance with ASTM Standard E96 in gram per square meter and day (g/(m²*d)) as further specified in the examples section below (also known as upright cup method). Briefly a cup with water that is covered by the test specimen. The so prepared sample was weighed before it was placed in an oven, which controlled temperature (23° C.), relative humidity (50% RH) and ventilation (1 m/s). Two phenomena contribute to the transport of vapor through a porous membrane; solid state diffusion (as a minor influence) and pore diffusion (the main mean of transport). In a non-porous (or dense, defect free) layer only solid state diffusion occurs. Solid state diffusion can be described according to E. L. Cussler (Cussler, E. L. *Diffusion.* (Cambridge University Press, 1997, p. 21) with the following term:

$$j = -\frac{DH}{l}(c_{in} - c_{out})$$

With j in gram per square meter and day (g/(m²d)) describing the flux out of the covered cup, D the diffusion coefficient in square meter per second (m²/s) of the water molecules in the membrane material, H the partition coefficient (dimensionless) for the solubility of the water molecules in the membrane material and $c_{in}$ and $c_{out}$ being the concentrations of water molecules within the cup and outside in mol per cubic meter (mol/m³).

In porous media the water molecules are free to diffuse through the pores, this is described by a flux with a corrected diffusion coefficient:

$$j = -\frac{D_{eff}}{l}(c_{in} - c_{out})$$

$$D_{eff} = \varepsilon \frac{D}{\tau}$$

Where $\varepsilon$ is the void fraction (dimensionless number between 0 and 1) of the porous membrane and $\tau$ stands for the tortuosity of the porous system (dimensionless number between 0 and 1).

For smaller pores diffusion, which is based on the interaction of the molecules with each other, gets limited because the water molecules not only interact with themselves but much more frequently with the pore walls. In air the free mean path is about 60 nm which means that pores with smaller diameter show Knudsen diffusion where the diffusion coefficient gets adjusted as follows[1]:

$$j = -\frac{D_{Kn}}{l}(c_{in} - c_{out})$$

$$D_{Kn} = \frac{d}{3}\left(\frac{2k_B T}{m}\right)^{\frac{1}{2}}$$

Where d is the pore diameter in meter (m), $k_B$ the Boltzmann constant in joule per kelvin (J/K), T the temperature in kelvin (K) and m the mass of the particles in gram (g).

For liquid medium, the waterproofing is a relevant parameter. In determining water proofing, the relevant driving force is pressure. The water column (WC) in meter (m) is determined in compliance with ISO 811. Briefly, water was pressed onto the sample at constant pressure increase (600 mmWC per minute) over time. The dry side of the sample is observed optically and the third penetrating water droplet is defined as the breakthrough of the sample and the pressure represented the water column (WC). Theoretical approximation can be done with the Hagen-Poiseuille equation:

$$\Delta p = \frac{32V\eta t}{A\varphi d^2}$$

With the pressure difference ($\Delta p$ in bar) calculated by V the volume flow in cubic meter per second (m³/s), $\eta$ the viscosity in bar times second (bar*s), t the layer thickness in meter (m), A the layer area in square meter (m²), $\varphi$ the area porosity as a dimensionless number at values between 0 and 1 and the diameter of the pores (d) in meter (m) (Kellenberger et al. *J. Membr. Sci.* 387-388, 76-82 (2012).

The "porosity" of a material as described herein is the volumetric percentage of pores of the total material. Porosity can be determined by porosimetry, by measuring the apparent material density, BET analysis or by microscope images. Preferably, the porosity is determined by micrograph analysis. In the context of this invention, a membrane or film is considered "porous", if porosity is 10-90%, preferably 50-90%, e.g. 55-60% and "non-porous", if porosity is below 10%, preferably below 5%. Pore mouth size may vary over a broad range, typically is within the range of 5 nm-2`000 nm.

The "specific surface area" is a known parameter and may be determined by nitrogen adsorption using the BET method (according to: Janssen et al, *Journal of Applied Polymer Science* 52, 1913, 1994). The BET method is widely used in surface science for the calculation of surface areas of solids by physical adsorption of gas molecules (e.g. Nitrogen molecules).

In general terms, the present invention relates in a first aspect to a method of manufacturing a porous polymer membrane (3) having a pore size of 5 nm-15`000 nm said method comprising the steps of (a) firstly providing shaped articles (1) comprising a polymer matrix (5) and particles (4) by a solvent free process (b) followed by converting said shaped articles (1) into a non-porous polymer film (2) by a solvent-free process and then followed by (c) removing said particles (4) from said film (2) by contacting said film with an aqueous composition (6) to thereby obtain the porous polymer membrane (3). This process is illustrated in FIG. 1 and further explained below.

It is believed that the use of solvent-free process steps provides a significant improvement over the known processes to prepare porous polymer membranes. Specifically, no organic solvents are required in the inventive process, thereby positively influencing the ecological balance sheet and cost considerations. The inventive manufacturing process for porous polymer membrane proves to be very versatile, reliable, and simple to control. The process is particularly suitable for fast and low-cost production of large area membranes.

In a further embodiment, inventive method provides a process for manufacturing porous polymer membranes (3) without using a stretching process/stretching step. Such stretching is limited to specific polymers and typically applied to a foil to obtain a membrane. Such additional step is difficult to control and thus disadvantageous for commercial manufacturing. Thus, the invention also provides a method as described herein, which does not involve a stretching step.

This aspect of the invention shall be explained in further detail below, first describing process steps followed by a description of the starting materials and particularly suitable embodiments:

Process Steps

The manufacturing processes as described herein are considered advantageous, as the individual steps are known in industry and already in commercial use. Further, the process described is very fast and may be implemented in a continuous process.

Step a: Manufacturing of pellets (1), comprising a polymer matrix, optional additives and filler is known per se.

In an embodiment, said step (a) involves co-extrusion of polymer (51), the polymer being optionally blended with additive (52), and particles (4).

In an embodiment, said step (a) is preceded by a synthesis step (d). In such synthesis step, polymer may be formed or blended with additive (51) (step d1) and/or particles (4) may be coated with coating material (41) (step d2). Such additional synthesis steps (d) are known per se and may take place in the presence or absence of a solvent. In an embodiment, step (d2) is solvent free.

In an embodiment, said step (a) is performed with said shaped articles (1) where the ratio polymer matrix (5) and particles (4) in said articles (1) is between 10:90 and 90:10, preferably between 50:50 and 20:80 (matrix:particles in wt %) and where said particles (4) are dispersed within said matrix (5).

Step b: The conversion of shaped articles/pellets (1) into a non-porous film is known per se and applied on a commercial scale.

In an embodiment, said step (b) is selected from film extrusion, calandering, injection molding, compression molding, blow molding, mold coating, and melt blowing. In a preferred embodiment, said step (b) is selected from film extrusion, calandering. This is particularly suitable for large area membranes.

In an embodiment, said step (b) is complemented by a cross-linking step (step b1)

In an embodiment, said step (b) is complemented by coating the film (2) on a substrate (7) (step b2).

In an embodiment, said step (b) provides a film of 5-200 micron thickness, preferably 30-80 micron thickness. In an embodiment, said step (b) provides a film of 0.01 μm-1000 μm thickness, preferably 2 μm-60 μm thickness.

Step c: The continuous salt phase/oxide phase in such nanocomposite membranes is dissolved which results in a nano-porous polymer film (the porous polymer membrane (3)). This individual step is known and described e.g. in EP3178873. Without being bound to theory, it is believed that the coating material, if present, remains within the polymer structure and is located on the surface of the pores. Suitable are aqueous solvents, such as water or acidic aqueous solutions (e.g. acetic acid or hydrochloric acid). The choice of solvent particularly depends on the type of particles (metal salt/metal oxide) used.

In an embodiment, said step (c) is performed in 90 min or less, such as in 5 min.

It is believed that the dissolution step (c) is a key element of the manufacturing process and also a key element to obtain the inventive porous polymer membranes (3).

In a further embodiment, process step (c) may be repeated. This measure ensures a complete removal of particles (4). Thus, step (c) also includes multiple washings and dryings. When using a multi-step protocol, either the same or different aqueous compositions may be used, for example a diluted aqueous acid first, followed by water.

General Process Characteristics: In an embodiment, the inventive method does not involve a phase separation step. Such phase separation is limited to specific polymers and the corresponding pore formation is highly sensitive to various process parameters (e.g. temperature, humidity, time) which need to be carefully controlled simultaneously. It is apparent that such process is disadvantageous for fast and large-scale commercial manufacturing. Thus, the invention also provides a method as described herein, which does not involve a phase separation step. In the context of this invention, a phase separation step is considered a separate step in a manufacturing process that requires specific equipment. It is also noted that phase inversion is only observed for a limited number of polymers/combination of polymers. The present invention is not limited to such specific polymers or combinations thereof and thus considered much more versatile.

In an embodiment, no organic solvents are used in said steps a) to c).

In an embodiment, said steps b) and c) are performed without the aid of a substrate. Accordingly, it is possible to directly obtain films (2) and inventive membrane (3) without the need of providing and removing a support material. This direct approach is beneficial compared to known methods described above.

In an embodiment, said steps a) and b) are combined into one single step. In such embodiment co-compounding steps are omitted. Rather, polymer matrix (5) and particles (4) are directly mixed in a suitable device, such as a film extruder. This embodiment is considered beneficial in case of coated particles. This embodiment is further considered beneficial in case of polymers having a good flowability, which is typically indicated by low melting points of the polymer. Thus, particles (4) comprising a coating (41) are combined with thermosetting polymer (51), such as PCL, and optionally additives (52) and subjected to the inlet of a film extruder. This embodiment avoids separate preparation of shaped articles (1). Rather, the starting materials are directly converted to a non-porous polymer film (2). This embodiment is particularly beneficial as it reduces manufacturing by one step and therefore simplifies production on large scale.

In a further embodiment, the invention provides a method as described herein, wherein one or more, such as steps b)

and c), preferably steps a) to c), much preferably all steps, are adapted to a continuous process. Such continuous process may be a film extrusion, calandering, injection molding, compression molding, blow molding, mold coating, melt blowing. These processes also enable the production of multilayer material, comprising the inventive porous membrane as one of said layers. Such multilayer material may have a thickness of 1 mm, or even more. Such multilayer materials can naturally take a more complex function than single layer materials. This can be advantageous in many applications, both textile and non-textile.

The manufacturing process described provides porous polymer membranes in virtually unlimited size. As the manufacturing steps do not provide a limitation regarding the size of the material (except for the equipment used) large sheet materials, in terms of length and width, are obtainable. Thus, the invention also provides a process as disclosed herein, wherein the porous polymer membrane has an area of more than 100 cm², preferably more than 1000 cm², most preferably more than 1 m². When using roll-to-roll equipment, porous polymer membranes with 100 m², or even more, can be prepared in a single piece. In embodiments, the inventive membranes are of 1.4-1.6 m width and 500-1000 m length per roll.

Starting Materials

The manufacturing processes as described herein are considered advantageous, as the individual starting materials are commercially available or may be obtained according to known methods.

Particles (4): The particles described herein are also known in the field as "fillers" or "porogenic agents". Particles may be uncoated or coated as described below. The invention contemplates using one type of particle (e.g.: unimodal size, and/or same material) or more than one type of particles (e.g.: bimodal size distribution, different materials, coated and non-coated).

Suitably, particles (4) are pre-manufactured. By pre-manufacturing is meant that particles do not form in-situ during process step (a). Typically, the non-coated particles (4) are obtained from a supplier in the required quality. Coated particles (4) may be obtained from a supplier or coated according to known methods by combining coating material (41) and particles (4), optionally in the presence of a diluent.

Suitably, particles (4) have a particle size in the range of 5-10`000 nm, preferably 5-4`000 nm.

Suitably, particles (4) are selected from the group consisting of organic salts, metal salts, metal oxides; and are optionally coated with a coating (41). As apparent from the above, suitable particles (4) dissolve in aqueous medium, e.g. a solubility of at least 1 g at pH 1-14/20° C., preferably 10 g at pH 1-14/20° C.

In one embodiment, particles (4) consist of a salt selected from the group consisting of carbonates, hydrogencarbonates, sulphates, halogenides, nitrates and phosphates. In one embodiment, particles (4) consist of an oxide selected from the group consisting of ZnO and MgO.

In one embodiment, particles (4) consist of a salt selected from the group consisting of carbonates, hydrogencarbonates, sulphates, halogenides, nitrates and phosphates and a coating material (41) selected from the group consisting of carboxylic acids, aryl-alkoxy-silanes alkyl-aryl-alkoxy-silanes and alkyl-alkoxy-silanes. In one embodiment, particles (4) consist of an oxide selected from the group consisting of ZnO and MgO and a coating material (41) selected from the group consisting of carboxylic acids, aryl-alkoxy-silanes alkyl-aryl-alkoxy-silanes and alkyl-alkoxy-silanes.

A particularly preferred class of particles are CaCO3 particles. Typically, CaCO3 particles are obtained by a precipitation process or by extraction from a mine and milled to a desired size.

A particularly preferred class of particles is NaCl. Typically, NaCl particles are obtained by evaporation of salt water or by mining of rock salt and then milling to the desired size.

Flame synthesis is an alternative route to obtain particles as defined herein.

Coating (41): As discussed above, particles may be coated or non-coated.

Suitable coating materials (41) may be selected from hydrophobic or hydrophilic materials. Such materials are commercial items or may be prepared according to known methods; they are selected to improve compatibility with polymer (51). It was found the coating (41) beneficially influences manufacturing of membranes and also affects membrane properties.

Hydrophobic coating materials are suitable for example in case water—repellent properties are a relevant membrane property. By way of example, membranes for clothing are mentioned. Suitable hydrophobic coating materials may be selected from the group consisting of C6-C24 carboxylic acids, preferably C6-C24 monocarboxylic acids including, saturated fatty acids, and unsaturated fatty acids, particularly preferably stearic acid;

C15-C40 alkanes, preferably paraffin oil and paraffin wax; vegetable oils, preferably castor oil;

polyesters or polyamides with m.p. 50-70 ° C., preferably polycaprolactone; and

Poly(maleic anhydride) derivatives with linear or branched C6-C40 alkyl chains, preferably Poly(maleic anhydride-alt-1-octadecene; and siloxanes in the form of nanoparticles or filaments; and C6-C24alkyl-C1-C4alkoxy-silanes, preferably C6-C24alkyl-methoxy-silanes.

Hydrophilic coating materials are suitable to prepare membrane filters. Suitable hydrophilic coating materials may be selected from the group consisting of polyol derivatives, preferably Propan-1,2,3-triol, polyethylene glycol (Mn=200–50'000), polyethylene oxide (Mw=100'000–1'000'000) and polypropylene glycol;

Polyvinylpyrrolidone (Mw=50'000–1'000'000); and chitosane.

A particularly suitable class of coating materials are polyol derivatives, such as glycerine and C6-C24 mono-carboxylic acids, such as stearic acid, and paraffin.

Suitably, the coated particles have an average size of the core of 5-10`000 nm and the coating amounts to 0.1-10 wt %, preferably 1-4 wt %, of the coated particle. It was found that such coating allows a manufacturing of large membranes with high WVTR and high WC. Until now, it was not possible to produce membranes on a commercial scale based on a solvent-free process and obtaining membranes of virtually unlimited size meeting with the requirements of WVTR and WC.

In embodiments, said particles are non-coated particles selected from the group consisting of CaCO3 (preferably with particle size of 0.3-10 micron, such as 0.5 μm-6 μm), NaCl (preferably with particle size of 0.3 μm-10 μm, such as 0.5 µm-6 µm) and ZnO (preferably with particle size of 0.005 µm-2 µm, such as 0.05 µm-1 µm).

In embodiments, said particles are coated particles, said particles comprise a CaCO3 core and a coating (the coating preferably containing C6-C24 carboxylic acids, C6-C24 hydrocarbon, linear or branched bulky organic molecules selected from the group consisting of short chain polymers, amphiphilic surfactants, alkyl-silanes derivatives, polyol-derivatives, particularly preferably polyol derivatives); the coated particles have an average size of the core of 5-10`000 nm and the coating amounts to 0.1-10 wt % (preferably 1-4 wt %) of the coated particle.

In embodiments, said particles are coated particles, said particles comprise a NaCl core and a coating (the coating preferably containing C6 -C24 carboxylic acids, C6 -C24 hydrocarbon, linear or branched bulky organic molecules selected from the group consisting of short chain polymers, amphibilic surfactants, alkyl-silanes derivatives, polyol-derivatives, particularly preferably polyol derivatives; the coated particles have an average size of the core of 5 -10000 nm and the coating amounts to 0.1-10 wt % (preferably 1-4 wt %) of the coated particle.

Coated particles are prepared prior to step (a) in a separate process as outlined above. The invention thus relates to a method as described herein, wherein the particles are not prepared in situ, i.e. pre-manufactured.

Polymer (51): The term polymer is known in the field and includes homo-polymers, co-polymers and blends of polymers. Suitable polymers are selected from the class of thermoplastic polymers and thermosetting polymers.

Thermoplastic Polymers are polymers that that becomes pliable or moldable at a certain elevated temperature and solidifies upon cooling; this process being reversible. Such polymers include polyesters (including PCL, PLA and PET), polyolefines (including PE and PP), polystyrene, polyethers, polyamides, polyurethanes. Polycaprolactone (PCL), Polyurethane (TPU) and Polylactic acid (PLA) being preferred polymers.

Thermosetting Polymers are polymers that may be melted and hardened only once. Typically, such thermosetting polymers are crosslinked. Accordingly, thermosetting polymers include the classes of polymers as defined above which are crosslinked.

Additives (52): Additives are widely known in the field of polymer chemistry. They are used to improve product quality and/or to improve processing properties. Suitable additives may be selected from a broad range of known additives and mixtures thereof and are known in the field. The term additives includes film flow-, film uniformity-, anti-orange peel- and wetting-agents. Such additives are commercially available, e.g. from Byk Additives and Instruments, Evonik Industries, CRODA International, and include compounds selected from the group consisting of fatty acids, C6-C24 hydrocarbons, polyethylene glycols and glycerine.

Aqueous composition (6): The solvent (6) is selected to ensure dissolution of the particles/coated particles without dissolving the polymer. It is surprising that not only non-coated particles, but also the coated particles as discussed herein can be readily dissolved in aqueous solution.

Shaped Articles (1): The shaped articles described in the context of step (a) are also known in the field as "pellets" or "powders". Typical size range for pellets is between 0.5 and 5 cm; for powders between of 0.1 mm and below 5 mm. Powders may be obtained by grinding polymer (5) and co-compounding particles (1) to thereby obtain such shaped articles (1) in the form of a powder.

Suitable articles (1) comprise a matrix (5) and particles (4) dispersed within said matrix in a ratio of 90:10 to 10:90 (matrix:particles in wt %), preferably 50:50 to 10:90 (wt. %). Compared to traditional methods, the particles loading within the pellets is considered high.

The matrix comprises polymer (51) and optionally additives (52). In one embodiment, the matrix consists of polymer (51). In one further embodiment, the matrix (5) consists of a polymer (51) and one or more additives (52).

Porous polymer membrane (3): It is apparent that a wide range of porous polymer membranes may be obtained using the present process.

By suitable selection of particles (such as size, coating material and amounts) and by the selection of process parameters (such as extrusion parameters) porosity and pore size distribution may be varied over a broad range. Thus, the invention also provides a process as disclosed herein, wherein the porous polymer membrane (3) complies with one or more of the following:

Thickness: The membranes (3) obtained according to the inventive process show a thickness varying over a broad range and depend on its intended application. Suitable values are 0.01 µm-1000 µm, preferably 2 µm-60 µm for single layer membranes and up to 180 °m for triple layer membranes. For selected applications, also very thin or very thick membranes may be manufactured, such as from 0.01 µm-1000 µm. For such extreme ranges, performance does not stay the same for WC and WVTR. Thick membranes (several hundred micrometres or more) are particularly suited for applications in the form of multilayers.

Porosity: Suitable are 10-90%, preferably 50-90% such as 55-60%.

Pore size: Suitable are 5nm-15`000 nm; preferably 200 nm-4`000 nm in case of hydrophobic polymers; or preferably 5 n -500 nm in case of hydrophilic polymers.

Water column (WC): Suitable are values of at least 4.8 m, preferably at least 9 m, particularly preferably at least 18 m.

Water vapour transmission rate (WVTR): Suitable are values of at least 500 g/m2 per day, preferably at least 700 g/m2 per day.

Water contact angle: Suitable are values of at least 50°, preferably at least 95°. This shows the hydrophobicity of the polymer membrane (3).

Stress: Around 3-5 MPa for the porous samples measured so about 7-10 MPa if the porosity is included.

As can be seen, the inventive process allows for manufacturing of membranes having a very high porosity. Such high porosity is advantageous for a high water vapour transfer rate and can also provide significant thermal insulation. Both is of obvious advantage in textile applications, in buildings and when used in multilayers.

Further, by suitable selection of polymers (51) and additives (52), a wide range of membranes are obtainable, particularly where the membrane (3) is free of halogenated polymers and/or
the membrane (3) consists of biodegradable polymer according to ISO 16929 and ISO 20200 (disintegration test methods for industrial composting), ISO 14853 and EN 14995 (anaerobic-digestion environment) or EN 13432 (composting and biodegradation). They usually involve the measurement of CO2-emissions.

Again, the applicability to a broad range of polymeric material is of obvious advantage.

It was found that specific combinations of materials were found particularly suitable.

In an embodiment, the polymer (51) is hydrophilic and said particles (4) are coated or non-coated, preferably non-coated.

In an embodiment, the polymer (51) is hydrophobic and said particles (4) are coated or non-coated, preferably said particles (4) comprise a coating (41).

In an embodiment, the polymer (51) is hydrophobic and said particles (4) are coated, the coating being selected from C6-C24 carboxylic acids as defined above, preferably stearic acid. This embodiment provides membranes (3) with hydrophobic properties.

In an embodiment, the polymer (51) is hydrophobic and said particles (4) are coated, the coating being selected from C6-C24 hydrocarbons and paraffin, preferably paraffin. This embodiment provides membranes (3) with hydrophobic properties.

In an embodiment, the polymer (51) is hydrophilic or hydrophobic and said particles (4) are coated, the coating being selected from polyol-derivatives as defined above, preferably glycerol-coated. This embodiment provides membranes (3) with hydrophilic properties.

In an embodiment, the polymer (51) is hydrophilic or hydrophobic and said particles (4) are coated, the coating being selected from PVPs as defined above). This embodiment provides membranes (3) with hydrophilic properties.

The present invention relates in a second aspect to shaped articles (1). Such articles, particularly in the form of pellets or powders, are useful starting materials a manufacturing process as described herein. Such articles are available according to step (a) discussed above, particularly by co-extrusion or co-compounding. This aspect of the invention shall be explained in further detail below:

In embodiments, the invention provides for an assembly of shaped articles (1) ("pellets" or "powders"), wherein each member of said assembly comprises a polymer matrix (5) and particles (4) dispersed therein; and said matrix (5) comprises a thermoplastic or thermosetting polymer (51) and optionally additives (52) as defined herein (particularly in the first aspect and the claims); and said particles (4) are as defined herein (particularly in the first aspect and the claims); characterized in that the ratio matrix (5):particles (4) is between 1:1 to 1:9 (wt %). These shaped articles are suitable as a starting material in the inventive method. The amount of particles (4) ("filler") within said shaped articles (1) ("pellets", "powders") is comparatively high.

In embodiments, the shaped articles comprise a polymer (51) which is hydrophilic and particles (4) which are non-coated.

In embodiments, the shaped articles comprise a polymer (51) which is hydrophobic and particles (4) which comprise a coating (41).

In embodiments, the pellets are of 0.5-5 cm size, and/or the powder has an average particle size of 0.1 mm to less than 5 mm.

In embodiments, the invention provides for the use of shaped articles (1) as described in this aspect of the invention, in a method as described in the first aspect of the invention.

In embodiments, the invention provides for the use of shaped articles (1) as described in this aspect of the invention, for manufacturing a membrane (3) as described in the third aspect of the invention.

In a broad sense, any (coated or uncoated) salt or metal oxide particle may be used, preferred classes of particles and coating materials are disclosed above, first aspect of the invention. The manufacture of suitable coated particles (4) is known in the field. It was found advantageous to use pre-manufactured coated particles.

Additives (52) may be selected as discussed above, e.g. from the group consisting of surfactants, polymerisation initiators, stabilizers, cross-linking agents, wetting agents.

The present invention relates in a third aspect to novel polymer membranes (3). This aspect, particularly advantageous polymers and characteristics of the inventive membranes, are outlined below.

In an embodiment, the invention provides for a porous polymer membrane (3) obtainable by, or obtained by, a process according to the first aspect of the invention, wherein said membrane complies with all characteristics (i) to (iii) and optionally with one, two or three characteristics (iv) to (vi):
(i) water column (WC) of at least 4.8 m;
(ii) has a WVTR of at least 500 g/m2 per day;
(iii) flux of at least 1 L*m-2*h-1;
(iv) has a thickness 0.01 µm-1`000 µm, preferably 10 µm-100 µm;
(v) poremouth size of 5 nm-2`000 nm;
(vi) has a porosity of 10-90%.

In an embodiment, the invention provides for a porous polymer membrane (3) comprising, particularly consisting of, a polymer (51), wherein said membrane complies with all characteristics (i) to (v) and (vii) and optionally with (vi):
(i) water column (WC) of at least 4.8 m;
(ii) has a WVTR of at least 500 g/m2 per day;
(iii) flux of at least 1 L*m-2*h-1;
(iv) has a thickness 0.01 µm-1000 µm, preferably 10 µm-100 µm;
(v) pore mouth size of 5 nm-2`000 nm;
(vi) has a porosity of 10-90%;
(vii) the polymer (51) is selected from the group of thermoplastic polymers as defined herein (particularly first aspect of the invention and the claims) or a thermosetting polymer as defined herein (particularly first aspect of the invention and the claims).

Membrane: In one embodiment, the invention relates to a polymer membrane, said membrane has (i) a thickness and/or (ii) a porosity; and/or (iii) a pore size; and/or (iv) tensile properties and/or (iv) a water column; and/or a (v) water vapour transmission rate; and/or (vi) a water contact angle as described above, first aspect of the invention. Due to the unique manufacturing process, as outlined herein, the present invention provides porous membranes (or even nanoporous membranes) combining specific properties for organic polymers. It is considered advantageous that the above parameters may be adjusted due to the specific application of the inventive membrane.

In one embodiment, the inventive membrane may consist of one single layer. This embodiment is advantageous for jackets and outdoor clothing, house wraps in construction (to manage water and steam in buildings), packaging materials (e.g. for food, consumer goods and pharmaceuticals), agricultural tarps and sensors.

In one further embodiment, the inventive membrane may consist of two or more layers, such as 2 or 3 layers. This embodiment is advantageous for outdoor clothing (thereby providing enhanced comfort due to better sweat management, particularly by transporting sweat inside the jacket layer from ill-accessible to more accessible area of the clothing), cooling textiles (i.e. materials that provide a cooling effect to the user through evaporation of water from the multi-layer material), packaging of living organisms, packaging of food, pharmaceuticals and sensitive consumer goods, cooling curtains (allowing passive cooling in and around buildings and public transport), humidification of air in air acclimatization units. Further applications are in flexible gas absorbers, air cleaning devices, personal hygiene and personal protection equipment.

Polymers: As outlined above, a wide variety of polymers may be used for the inventive membranes. In one embodiment, the polymer is selected from the group of polymers listed above, first aspect of the invention.

Advantageously, such polymers are free of halogens, particularly free of fluorine. This is considered advantageous, as the membranes are environmentally benign. Advantageously such polymers are biodegradable. This is considered advantageous, as the membranes are environmentally benign and desired in certain industrial applications. Poly lactic acid (PLA) being a preferred polymer.

In a further embodiment, Polycaprolactam (PCL) being a preferred polymer.

Pores: As outlined above, the inventive material is porous. The inventive material is characterized by the size, type and amount of pores present. The size and type and amount of pores may be influenced by the type of coating, the amount of coating material, starting materials, the ratio particles : polymer, the manufacturing process, the type of coating material.

The pore size of the inventive membranes (defined by the diameter of the coated particles) is in the nanoscale range, typically between 5 nm-15′ 000 nm, preferably 200 nm-4˙000 nm for hydrophobic membranes and 5 nm-500 nm for hydrophilic membranes. The size of the pores may be determined by microscopy. Further, the pore size distribution may be precisely adjusted, due to the starting materials used.

The porosity, i.e. the volume of pores in relation to the volume of the membrane in total, may be varied in a broad range. Inventive materials show porosity in the range of 10-90 vol-%, preferably 20-90 vol-%, much preferred 50-90 vol-%, such as 55-60 vol-%. The porosity may be determined by micrograph analysis.

The pores of the material may be arranged in a way that the material is permeable, partly permeable or impermeable. The pores are predominantly perpendicular to the plane of the membrane. If essentially all pores of the material have dead ends, the material is impermeable. In the contrary, if essentially all pores of the material have open ends, the material is considered permeable. Consequently, if a fraction of the pores has dead ends, the material is considered partly permeable. In an advantageous embodiment, the present invention provides polymer membranes, wherein at least 50%, preferably at least 80% of said pores are interconnected.

Thickness: The thickness of the inventive membranes may vary over a broad range, such as from 0.01 μm-1˙000 μm. In case the inventive membrane is present in the form of a mono-layer, a suitable thickness is in the range of 0.01-1˙000 μm; preferably 1-500 μm most preferably 20 82 m -60 μm. In case the inventive membrane is present in the form of a multi-layer structure, a suitable thickness is in the range of 1 μm-1˙000 μm; preferably 30 μm-250 μm. Such membranes may also be termed "sheet material" or "porous foils"; these terms indicate that the material has a length and width which is at least one magnitude larger (preferably at least two magnitudes larger) than the thickness of the material.

Waterproofing (measured as WC) and breathability (measured as WVTR) of the inventive membranes is discussed above, first aspect of the invention.

Mechanical properties of the inventive membranes, like tensile strength, flexibility are discussed above, 1$^{st}$ aspect of the invention, making them suitable for many applications, such as in textile applications.

The present invention relates in a forth aspect to textile materials and articles comprising a porous polymer membrane (3) as described herein. In many cases, the membrane (3) will not be the commercial product, but an important intermediate for such commercial product. A wide variety of commercial products, including textile materials and articles may be equipped with the inventive porous polymer membrane (3). This aspect of the invention shall be explained in further detail below:

Textile material: In embodiments, the invention relates to a woven or non-woven textile material (7) comprising a polymer membrane as described herein (third aspect of the invention). Said membrane is laminated on said textile, or said membrane is self-supporting and connected with said textile membrane e.g. by gluing, welding, sewing and/or pressing. It is considered beneficial that the inventive membranes (3) may be readily applied to existing manufacturing equipment, as used in textile industry.

Commercial Products: The invention further provides for items (8), particularly selected from the group of clothing (such as coats, jackets, trousers, underwear); and containers (such as bags, backpacks); and separation devices (particularly filter devices, such as water filters), said item comprising a woven or non-woven textile material (7) as discussed above or a polymer membrane (3) as discussed in the third aspect of the invention.

Clothing comprising the inventive membrane fulfil the customer expectations, particularly regarding performance in WC and WVTR. Such textiles comprise fluorine free and optionally silicone free materials. Therefore the product can be disposed of in a naturally benign way, such as non-hazardous incineration. Further, a biodegradable chemical composition of such clothing can be ensured. The enabling technology is more versatile and eco-friendly when compared with existing processes; this is particularly due to the solvent-free process steps and the option for hydrophilic and hydrophobic membranes.

The inventive membranes are self-supporting ("free standing"). Therefore, they distinguish from known membranes of similar thickness and porosity on a support. However, the inventive material is suitable for coating an appropriate support. The possibility of manufacturing such membrane independent from a specific support makes it very versatile. In embodiments, the inventive membrane is applied on a substrate. Suitable substrates may be selected from a broad range of known substrates. The substrate may be any support compatible with the manufacturing process. It is further beneficial, if the membrane (3) and film (2) adheres to the substrate during manufacturing and can be removed after manufacturing. Suitable materials for a substrate include polymer materials, glasses, metals (such as aluminium), ceramics and paper (in each case coated or uncoated). In the case of textile manufacturing it can be advantageous to directly coat the here described films onto a tightly woven fabric. In this embodiment, it is advantageous if the polymer matrix adheres well to the type of polymer or biopolymer used in the textile substrate. For outdoor clothing, suitable substrates are tightly woven polyamides, polyolefines or polyesters.

The present invention further relates to uses/methods of use of the membranes, textiles and intermediates as described herein.

To further illustrate the invention, the following examples are provided. These examples are provided with no intent to limit the scope of the invention.

I General Procedure

The general procedure for the following small scale experiments is the following:
1. Co-extruding of particles (4) and polymer pellets (5) to shaped particles (1)
2. Non-porous film (2) production by using a heat press, resulting in approximately 10 cm diameter round shapes samples of 70-150 microns thickness.
3. Porous membrane (3) production by washing the non-porous film (2) in an aqueous bath (6).

The general procedure for larger scale experiments is similar but instead of a press, a film extruder was employed, resulting in >100 m length, 20-30 cm width samples and thickness from 20-500 microns.

The general analytic procedures are as follows:
Thickness of the membranes is determined by magnetic induction process and analysis of SEM micrographs.
Water Column of the obtained membranes is determined in complance with ISO 811, described above.
Breathability/WVTR of the obtained membranes is determined in compliance with ASTM E96, described above.
LMH of the obtained membranes is determined by measuring liquid volume which passes a defined membrane area in a defined time at a defined applied pressure. LMH represents the flux in litre per square metre, per bar and hour ([l/(m2*bar*hour)].
Retention of the obtained membranes is determined by measuring the concentration of fluorescent nanoparticles (50-250 nm) before (feed solution) and after filtration (permeate),It is calculated with the following equation:

$$\text{Retention} = 1 - \frac{c(\text{permeate})}{c(\text{feed solution})}$$

II Example of Tests for Hydrophobic Membranes

A. Small Scale

1. Scale: 35 g for each loading and each types of additives
Polymer: Polylactic acid (PLA)
Loading: 60/40, 70/30, 80/20 filler/Polymer
Additives: TBC, castor oil, Paraffin wax (each one with 3 loading: 19 wt %, 27 wt % 38 wt %) (with respect to polymer)
Filler: CaCO3
Functionalization: 4% stearic acid
Results: Co-extrusion yielded shaped articles (1). All membranes (3) achieved relative high breathability (higher for higher filler loading), some were more hydrophobic than others.
2. Scale: 35 g for each loading and each types of additives
Polymer: Polyester
Loading: 60/40, 70/30, 80/20 filler/Polymer
Additives: TBC, castor oil, Paraffin wax (each one with 3 loading: 19 wt %, 27 wt % 38 wt %, with respect to polymer)
Filler: CaCO3
Functionalization: 4% stearic acid
Results: Co-extrusion yielded shaped articles (1). All membranes (3) achieved relative high breathability (higher for higher filler loading), some were more hydrophobic than others
3. Scale: 5 g for each polymers
Polymer: Polyester (PE), PLA, Polycaprolactam (PCL), Polyamide (PA), Polytrimethylene terephthalate (PTT), Polypropylene (PP)
Loading: 60/40, 67/33, 70/30, 80/20 filler/Polymer
Additives: Tributyl citrate (only for PE)
Filler: CaCO3
Functionalization: 4% stearic acid
Results: see Table 1

TABLE 1

Examples of performance obtained by the use of the solvent-free process to make porous hydrophobic membrane (see small scale 3. description)

| Polymer | CaCO3/Polymer loading (wt. %/wt. %) | thickness (microns) | WC (m) | WVTR (g/m2/day) |
|---|---|---|---|---|
| PLA | 60/40 | 65 | 20 | 350 |
| PLA | 70/30 | 61 | >50 | 484 |
| PCL | 60/40 | 71 | 25 | 560 |
| PCL | 67/33 | 70 | 7.5 | 730 |
| PA | 60/40 | 78 | 50 | 668 |
| PE** | 60/40 | 52 | 18 | 964 |
| PTT | 60/40 | 84 | 1* | 684 |
| PP | 70/30 | 63 | 24 | 850 |
| PP | 80/20 | 71 | 19 | 650 |

*Presence of holes in the porous membrane (3), which explains the low water column results.
**PE containing Tributyl citrate 5:1 wt/wt.

Without being bound to theory, it is believed that addition of plasticizer (52) will improve the flowability of a too brittle polymer and hence facilitate the extrusion process.
4. Scale: 5 g
Polymer: PLA
Loading: 60/40 filler/Polymer
Additives: none
Filler: NaCl
Functionalization: none
Results: Co-extrusion yielded shaped articles (1). The rough surface of the pellets (1) and the subsequent film (2) are believed due to large NaCl particles (4). Without being bound to theory, it is believed that reduced particle size and coating of the NaCl filler particles will improve the process.

B. Large Scale

1. Scale 5 kg
Polymer: PLA
Loading: 60/40 filler/polymer
Additives: TBC 20 wt % (with respect to polymer)
Filler: CaCO3
Functionalization: none
Results: Co-extrusion yielded shaped articles (1), film making (2) by pilot machine at ETH worked well but the resulting thickness was too high (>300 microns). Complete dissolution of CaCO3 (6) out of the polymer was difficult throughout the thickness. Without being bound to theory, it is believed that reduced thickness will improve the process.
2. Scale: 20 kg
Polymer: PLA
Loading: 60/40 filler/Polymer
Additives: TBC 20 wt % (with respect to polymer)
Filler: CaCO3

Functionalization: 4% stearic acid

Results: Co-extrusion yielded shaped articles (1), film making (2) by pilot machine worked well with thickness going from 20-200 μm by changing speed of rolls. Membrane (3) resulted in good breathability and hydrophobicity.

3. Scale: 100 kg (for each loading type)
Polymer: PLA+TBAT
Loading: 50/50, 60/40, 65/35, 70/30 filler/Polymer
Additives: none
Filler: CaCO3
Functionalization: 1% stearic acid Results: Co-extrusion yielded shaped articles (1), film making (2) by melt blowing pilot machine with thickness going from 20-50 μm and film extrusion pilot machine with thickness going from 70-200 μm. Membranes (3) resulted in good breathability and hydrophobicity.

4. Scale: 100 kg (for each loading type)
Polymer: hydrophobic TPU
Loading: 50/50, 60/40, 65/35 filler/Polymer
Additives: none
Filler: CaCO3
Functionalization: 1% stearic acid Results: Co-extrusion yielded shaped articles (1), film making (2) by melt blowing pilot machine with thickness going from 20-50 μm and film extrusion pilot machine with thickness going from 70-200 μm. Membranes (3) resulted in good breathability and hydrophobicity.

III Example of Tests for Hydrophilic Membranes

A. Small Scale

1. Scale: 15 g
Polymer: PLA, PESU, EVOH, PE/PVAc Copolymer, PET, PA
Loading: 60/40, 70/30, 80/20 Filler/Polymer
Additives: PVP, TEC, Polyol plasticizer
Filler: CaCO3, ZnO nanoparticles
Functionalization: PEG, PVP Results: Co-extrusion yielded shaped articles (1). Most membranes (3) achieved relative high retention and water flux. Some of them resulted very brittle and we could not properly test them. It is believed that changing polymer chain length will improve the process. See Table 2.

TABLE 2

Examples of performance obtained by the use of the solvent-free process to make hydrophilic porous membrane (see small Scale 1$^{st}$ description)

| CaCO3/PLA (wt. %/wt. %) | Thickness (microns) | LMH (1/(m2*h*bar)) | Retention (250 nm beads) |
|---|---|---|---|
| 75/25 | 195 | 764 | 47.9% |
| 82/18 | 225 | 835 | 80.3% |
| 90/10 | 265 | 5992 | 98.0% |

B. Large Scale

1. Scale: 2 kg
Polymer: PLA
Loading: 80/20 Filler/Polymer
Additives: PVP, Polyol plasticizer
Filler: CaCO3
Functionalization: none Results: Co-extrusion yielded shaped articles (1) with well-dispersed CaCO3 particles (4). The resulting thin film achieved relative high retention and water flux.

2. Scale: 20 kg
Polymer: PLA
Loading: 80/20 Filler/Polymer
Additives: PVP, Polyol plasticizer
Filler: CaCO3
Functionalization: none Results: Co-extrusion (1) yielded shaped articles with well-dispersed CaCO3 particles (4). The film (2) was produced using a flat film extrusion machine and was directly pressed between two nonwoven fabrics (7). The resulting supported membrane (3) (7) shows high stability, flux and particle retention.

The invention claimed is:
1. A method of manufacturing a porous polymer membrane (3), said method comprising the steps of:
   a) providing shaped articles (1), comprising a polymer matrix (5) and particles (4) dispersed within said matrix, by a solvent free process;
   b) converting said shaped articles (1) into a non-porous polymer film (2) by a solvent-free process;
   c) removing said particles (4) from said film (2) by contacting said film with an aqueous composition (6) to thereby obtain the porous polymer membrane (3);
wherein:
said membrane (3) having
   an area of >1 m$^2$
   a pore size of 0.005 μm -15 μm, and
said shaped articles (1) comprise matrix (5) and particles (4) in a ratio of 90:10 to 10:90 (matrix:particles in wt %), and
said matrix (5) comprises a thermoplastic or thermosetting polymer (51) and optionally additives (52),
   said particles (4) are pre-manufactured; have a particle size in the range of 0.005 μm -10 μm; are selected from the group consisting of organic salts, metal salts, metal oxides; and are coated with a coating (41)
the coating (41) being selected from
   hydrophobic coatings; or
   hydrophilic coatings.
2. The method of claim 1, wherein said membrane (3) is of 5-200 micron thickness; and/or
is of >100m$^2$ size.
3. The method of claim 1, wherein
said polymer (51) is hydrophobic and said particles (4) comprise a coating (41) selected from the group of C6-C24 carboxylic acids, C6-C24 hydrocarbons and paraffin; or
said polymer (51) is hydrophilic or hydrophobic and said particles (4) comprise a coating (41) selected from polyol-derivatives and PVPs.
4. The method according to claim 1, wherein
said particles (4)
   consist of salts selected from the group consisting of carbonates, hydrogen-carbonates, sulphates, halogenides, nitrates and phosphates and a coating material (41) as defined in claim 1; or
   consist of oxides selected from ZnO and MgO and a coating material (41) as defined in claim 1; and/or
said polymer (51) is
   selected from the group of thermoplastic polymers; or
   is selected from the group of thermosetting polymers;

said additives (52) are selected from the group consisting of fatty acids and C6-C24 hydrocarbons, polyethylene glycols, and glycerine; and/or said aqueous solution (6) is selected from
water,
water containing a pH modifying agent selected from a weak base, a weak acid, a strong base, a strong acid, a buffer.

5. The method according to claim 4, wherein the coating material (41) is selected from the group consisting of carboxylic acids, aryl-alkoxy-silanes alkyl-aryl-alkoxy-silanes and alkyl-alkoxy-silanes.

6. The method according to claim 4, wherein
the thermoplastic polymers are selected from the group consisting of polyesters (including PLA and PET), polyolefines (including PE and PP), polystyrene, polyethers, polyamides (including PCL), and polyurethanes; or
the thermosetting polymers are selected from the group consisting of polyesters and polyurethanes that are cross-linked.

7. The method according to claim 1, wherein said porous polymer membrane (3)
a. has a porosity of 10-90% (as determined micrograph analysis); and/or
b. has a pore size of 0.2 μm-4 μm in case of hydrophobic polymers or of 5 nm-500 nm in case of hydrophilic polymers; and/or
c. is free of halogenated polymers; and/or
d. is biodegradable according to ISO 16929, ISO 20200, or ISO 14853.

8. The method according to claim 1, wherein
a. said step (a)
involves co-extrusion of polymer (51), which is optionally blended with additive (52), and particles (4) to obtain shaped articles (1) in the form of pellets; and/or
involves grinding of polymer (51), which is optionally blended with additive (51), and co-compounding it with particles (4) to obtain shaped articles (1) in the form of a powder; and/or
is preceded by a synthesis step (d); and/or
is performed with said shaped articles (1) where the ratio polymer matrix (5) and particles (4) is 50:50 to 20:80 (matrix:particles in wt %); and/or
b. said step (b)
is selected from film extrusion, calandering, injection molding, compression molding, blow molding, mold coating, melt blowing; and/or is complemented by a cross-linking step (step b1); and/or
is complemented by coating the film (2) on a substrate (7) (step b2); and/or
said step (b) provides a film of 5-200 micron thickness; and/or
said step (c)
is performed in 90 min or less.

9. The method according to claim 1, wherein
a. said method does not involve a phase separation step; and/or
b. said method does not involve a stretching step; and/or
c. said steps a) to c) are free of organic solvents; and/or
d. one or more of said steps a) to c) are performed continuously.

10. The method according to claim 9, wherein steps b) and c) are performed continuously.

11. The method according to claim 1, wherein
said steps a) and b) are combined into one single step.

12. The method according to claim 11, wherein said steps b) and c) are performed without the aid of a substrate.

13. The method according to claim 1, wherein said particles (4) are coated particles, said particles:
a. comprise a CaCO3 or NaCl core and
b. comprise a coating as defined in claim 1;
c. have an average size of the core of 0.005-10 micrometres; and/or
d. have a coating (41) that amounts to 0.1-10 wt % of the coated particle.

14. The method according to claim 13, wherein the coating (41) amounts to 1-4 wt % of the coated particle.

15. A woven or non-woven textile material (7) comprising a porous polymer membrane (3) and a fabric material, wherein said membrane (3)
is laminated on said fabric material, or
is self-supporting and connected with said fabric material by gluing, welding, sewing and/or pressing,
wherein said membrane is obtained by a process according to claim 1, and:
has a water column (WC) of at least 4.8 m (as determined by ISO811); and
has a WVTR of at least 500g/m$^2$ per day (as determined by ASTM Standard E96); and
has a thickness 2-60 micron; and/or
has a pore mouth size of 5 nm-2'000 nm; and/or
has a porosity of 10-90%; and
wherein said membrane
comprises biodegradable polymer according to ISO 16929, ISO20200, ISO14853, EN13432 or EN14995 and
is connected/laminated to a biodegradable fabric with a biodegradable glue.

16. An item (8), selected from the group consisting of clothing, containers and filter devices, said item comprising a textile material (7) according to claim 15.

17. The method according to claim 1, wherein the hydrophobic coatings are selected from the group consisting of C6-C24 carboxylic acids, C15-C40 alkanes, vegetable oils, polyesters and polyamides with m.p. 50-70° C., Poly (maleic anhydride) derivatives with linear or branched C6-C40 alkyl chains siloxanes in the form of nanoparticles or filaments, and C6-C24alkyl-C1-C4alkoxy-silanes.

18. The method according to claim 1, wherein the hydrophilic coatings are selected from the group consisting of polyol derivatives, PVP and chitosan.

* * * * *